United States Patent [19]

Nakamura

[11] Patent Number: 4,825,204

[45] Date of Patent: Apr. 25, 1989

[54] ADDRESS SETTING AND DATA TRANSMISSION SYSTEM

[75] Inventor: Yasuo Nakamura, Fuchu, Japan

[73] Assignee: Canon Kabushiki Kaisha, Tokyo, Japan

[21] Appl. No.: 883,749

[22] Filed: Jul. 9, 1986

[30] Foreign Application Priority Data

Jul. 15, 1985 [JP] Japan ................................. 60-154219

[51] Int. Cl.⁴ .............................................. H04Q 9/00
[52] U.S. Cl. .............................. 340/825.520; 340/531
[58] Field of Search ...................... 340/825.52, 825.07, 340/825.08, 825.5, 825.05, 531; 370/85, 13

[56] References Cited

U.S. PATENT DOCUMENTS

| | | | |
|---|---|---|---|
| 4,486,883 | 12/1984 | Kanai et al. | 340/825.07 |
| 4,495,493 | 1/1985 | Segarra et al. | 340/825.5 |
| 4,550,311 | 10/1985 | Galloway et al. | 340/531 |
| 4,551,721 | 11/1985 | Kozlik | 340/825.52 |
| 4,584,677 | 4/1986 | Kosaka | 370/13 |
| 4,602,366 | 7/1986 | Takumi | 370/85 |
| 4,637,013 | 1/1987 | Nakamura | 370/85 |
| 4,638,313 | 1/1987 | Sherwood, Jr. et al. | 340/825.52 |

Primary Examiner—Donald J. Yusko
Attorney, Agent, or Firm—Fitzpatrick, Cella, Harper & Scinto

[57] ABSTRACT

A data transmission system has plural transmission units or nodes with respective addresses, for transmitting data by token passing method. Each node is capable, upon receiving the transmitted data, of confirming the presence or absence of another node of a same address, in order to avoid transmission errors, resulting from overlapping addresses.

15 Claims, 4 Drawing Sheets

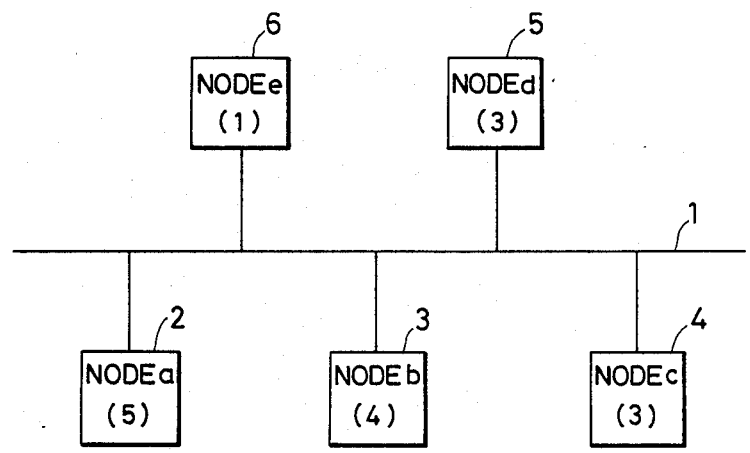

ADDRESS SETTING AND DATA TRANSMISSION SYSTEM

BACKGROUND OF THE INVENTION

The present invention relates to a data transmission system composed of a network of plural transmission units connected to a communication medium, in which the right of communication is transferred by a communication right transfer command bearing a destination address.

The "token passing method" is known as a communication control process in a so-called local area network (LAN) in which plural business machines are connected through a simple inexpensive communication channel. In this method, control data or a communication right transfer command, called a token and representing the right of transmission, is circulated in the network, and a transmission unit (hereinafter called a "node") receiving said token, or a node designated by said token alone acquires the right of transmission. Each node starts transmission upon receiving the token, and transfers the token to a downstream node when the transmission is completed.

In the token passing method in a bus network, each node constituting the network is given a specific address number, and a destination address is added to the token when it is transferred to a downstream node. Thus each node acquires the right of transmission only upon receiving a token having a destination address the same as the address number of that unit.

Consequently, if plural nodes in the network have the same address number, the following drawbacks will result.

In such a situation, the token is passed to plural nodes simultaneously, so that said plural nodes simultaneously initiate data transmission, thus resulting in data "collision" on the communication channel.

Such phenomenon leads to a temporary breakdown of the function of the network.

Such situation arises from an error in the address designation when the nodes are newly added or when the structure of the network is altered, but is often found only from a failure in the communication, thus undesirably deteriorating the working efficiency of the system.

SUMMARY OF THE INVENTION

In consideration of the foregoing, an object of the present invention is to provide a data transmission system capable of achieving data transmission without errors.

Another object of the present invention is to provide a data transmission control system capable of efficiently confirming proper address allocation of the transmission units constituting the network.

Still another object of the present invention is to provide a data transmission system allowing easy recognition of improper addresses of the transmission units in the network without a particular monitor device.

Still another object of the present invention is to provide a data transmission control process of high reliability capable of efficiently confirming the absence of overlapped address numbers in the entry of a transmission unit to the network, and prohibiting entry in the event that the address numbers are overlapping.

The foregoing and still other objects of the present invention, and the advantages thereof, will become fully apparent from the following description.

BRIEF DESCRIPTION OF THE DRAWINGS

FIG. 2 is a schematic view showing an example of the structure of local area network of the present invention;

FIG. 3 is a schematic view of a random access memory employed in said embodiment;

FIG. 4 is a chart showing an example of the format of a communication frame to be employed in the network system of said embodiment;

DETAILED DESCRIPTION OF THE PREFERRED EMBODIMENTS

Now the present invention will be explained in detail by an embodiment thereof shown in the attached drawings.

Figure 1:
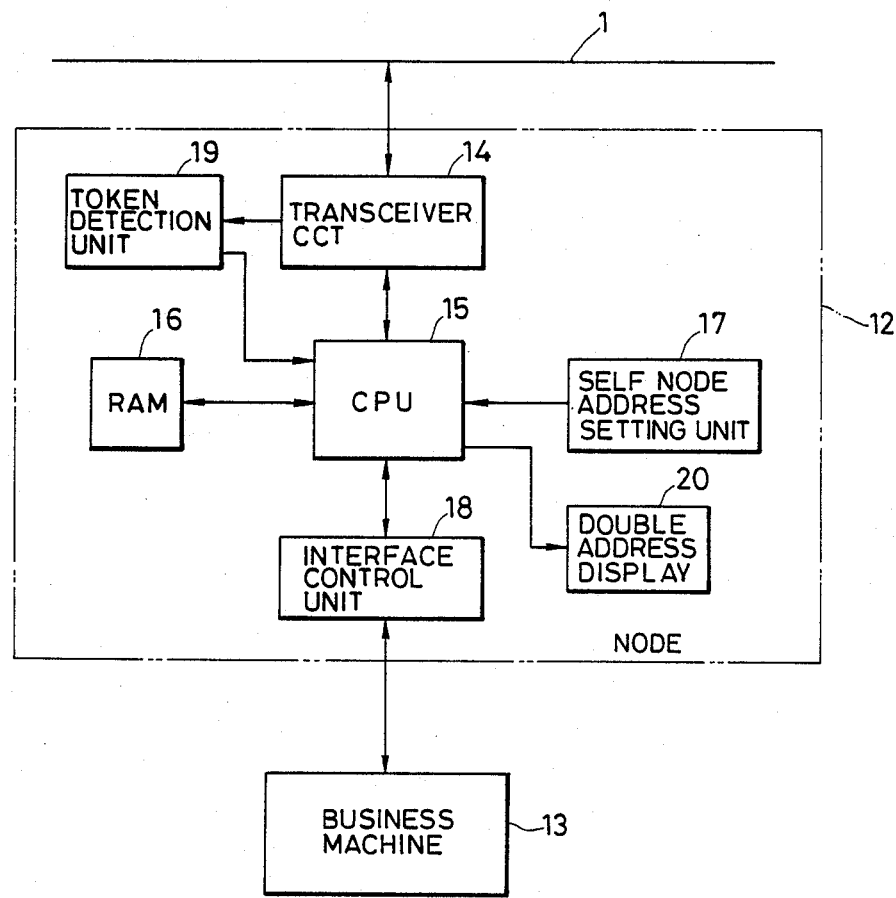
FIG. 1 is a block diagram of a transmission unit or node embodying the present invention.

At first reference is made to FIGS. 1 and 2 for explaining the structure of the embodiment.

FIG. 1 is a block diagram showing an example of the structure of a transmission unit or node, to be connected to a bus local area network as shown in FIG. 2, wherein shown are a network communication channel 1, a node 12 corresponding to any one of nodes a-e shown in FIG. 2, and a business machine 13 connected to the node 12 such as an office computer, a word processor, a reader, a printer, a file, etc.

The node 12 is provided therein with a transceiver circuit 14 for transmitting or receiving information to or from the communication channel 1; a microprocessor (CPU) 15 having a communication control program in the form of firmware in an unrepresented read-only memory (ROM) and controlling the entire node by means of the firmware; a random access memory (RAM) 16 for temporarily storing various information; a self node address setting unit 17 composed, for example, of DIP switches for selecting a node address specific to this node; an interface control unit 18 for input-output control for node the business machine 13 connected with the 12; a token detection unit 19 for detecting a token frame sent through the communication channel 1; and a double address display device 20 for indicating an abnormal state in which the same address is given to plural nodes.

FIG. 2 shows an example of a local area network in which plural nodes as shown in FIG. 1 are connected. In FIG. 2 there are shown a bus-type network communication channel 1; a node 2 (a(5)); a node 3 (b(4)); a node 4 (c(3)); a node 5 (d(3)); and a node 6 (e(1)), wherein the parenthesized number indicates the address number allotted to each node.

FIG. 3 shows a part of the memory area of the RAM 16 shown in FIG. 1.

An area Aa stores a transmission source address a, hereinafter called the first transmission source address, contained in a first token detected after the start of the power supply to the node. "A" indicates the address of the area Aa in the RAM 16. The RAM 16 also stores a destination address to be explained later.

Through the present embodiment explains data communication by a token passing method in a bus-type network, the present invention is applicable also to a ring-type network or to a data communication system not employing token passing method.

Figure 5:
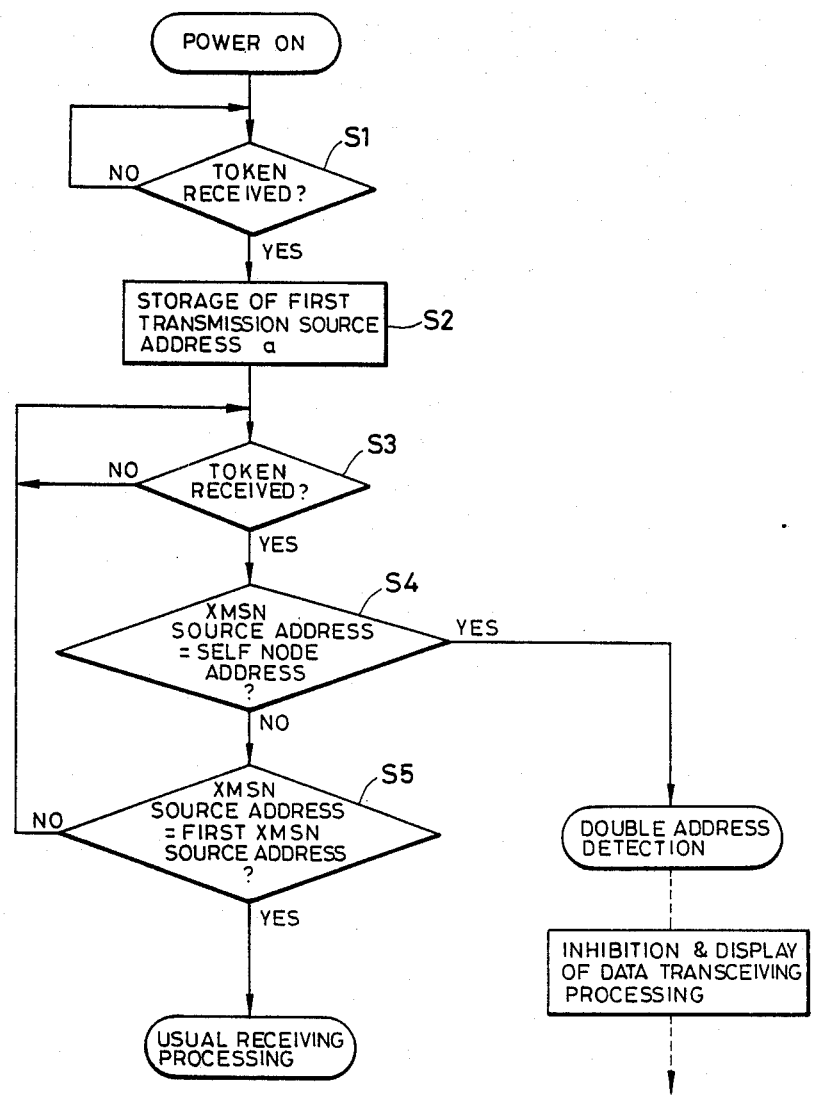
FIG. 5 is a flow chart showing the control procedure for detecting overlapping addresses in said embodiment.

Now reference is made to FIGS. 4 and 5 for explaining the function of the above-explained embodiment.

FIG. 4 shows an example of a data communication frame format employed in the present embodiment, comprising a frame control field (FC) 41 for a communication control command such as a communication right transfer command or token; a destination address field (DA) 42 indicating the destination node of the data communication frame; a transmission source address field (SA) 43 indicating the transmitting node of the data communication frame; and a data field 44 for various communication data.

In normal state, the CPU 15 in the node 12 awaits the reception of a token frame addressed to that node, through the network communication channel 1. The token frame has a token code in the FC field 41 and has a destination address. In case the destination address coincides with the address set by the self address setting unit 17 of a node, the node receives the token and acquires the right of communication or transmission. In this manner, the right of communication or transmission is transferred to a node designated by the destination address.

Figure 6:
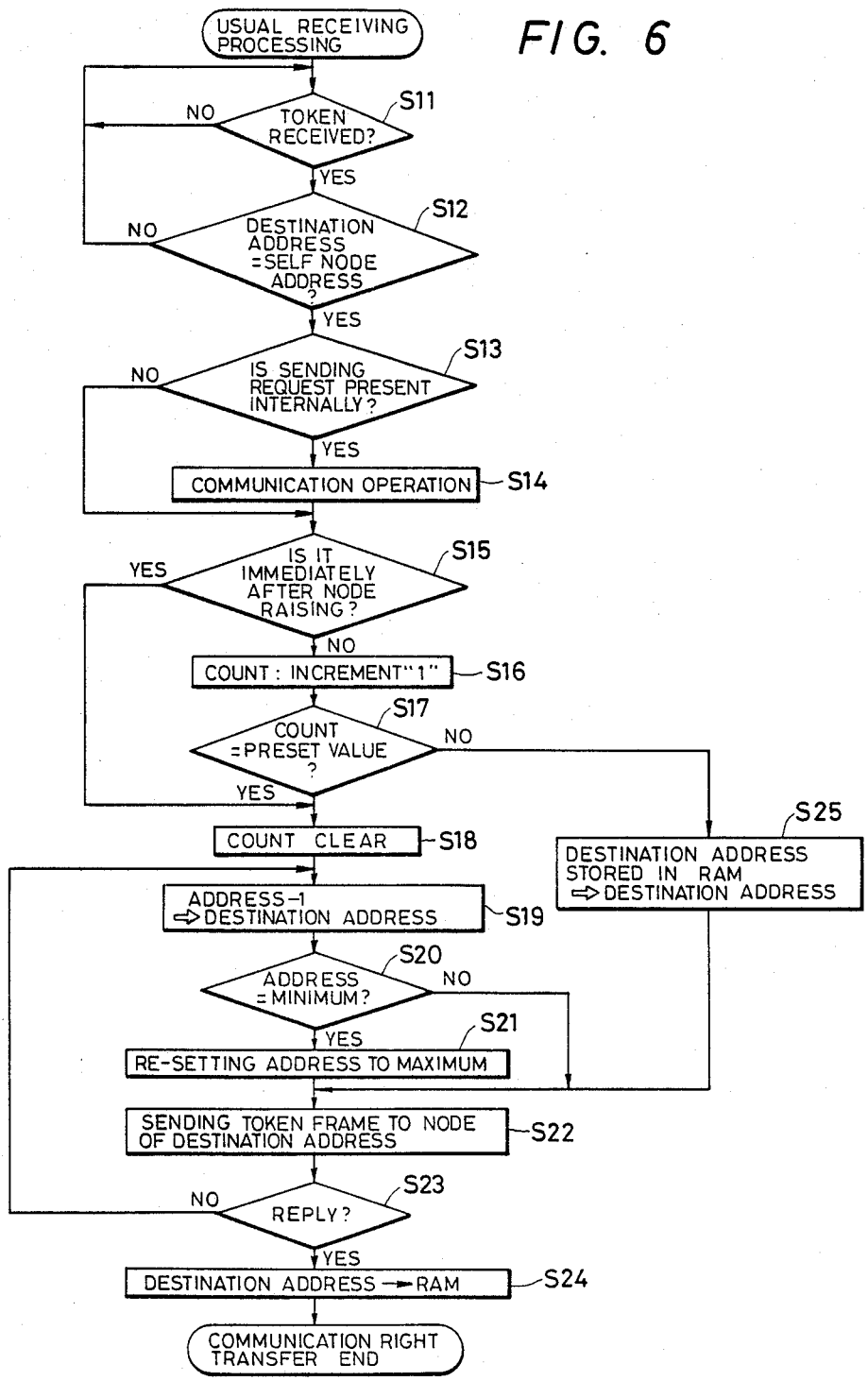
FIG. 6 is a flow chart showing the control procedure of an ordinary reception process in said embodiment.

In the following discussion there will be explained a procedure of ordinary reception, while making reference to a flow chart in FIG. 6, representing a corresponding control procedure.

Upon reception of a token frame addressed to this node (steps S11, S12), it confirms the presence of a demand for transmission from the business machine 13, etc. (step S13), and in the presence of such demand, transmits data onto the communication channel 1 through the transceiver circuit 14 (step S14).

The transmitted data contain a data transmission frame code in the FC field 14, an address of the destination of the data as the destination address, and a source address equal to the value set by the self node address setting unit 17. The token is then transferred to a downstream node after the transmission is completed, or in the absence of demand for transmission.

In this manner, each node having acquired the right of communication releases a token frame, in order to transfer the communication right to another node after the completion of communication process or in the absence of demand for transmission. However, each node does not remember the address of a node to which the communication right is to be transferred, immediately after the start-up of the network system, for example immediately after the start of power supply (step S3). The address means a smaller address number, closest to the self node address number, of a node in operable state. For this reason, the node which is going to transfer the communication right executes the following trial and discrimination steps.

(t-1) In a state immediately after the start-up of the node, the program jumps from a step S15 to a step S18 to clear the count, and a destination address is prepared by subtracting "1" from the self node address (step S19). Then a token frame is transmitted, with said destination address attached to the DA field (step S22). If a response, indicating the reception of the command, is not received within a predetermined time (step S23), the CPU identifies that a node with said destination address does not exist in the network system or is not operable due to the lack of power or another reason, and the program returns to the step S19. Thus, the above-explained procedure of subtracting one from the address number is repeated until a response is obtained.

(t-2) If a response, indicating the reception of the command, is not obtained even after the destination address reaches a minimum address predetermined in the network (step S9), the destination address is amended to a maximum address predetermined in the network (step S21) and a token frame is transmitted again (step S22).

(t-3) If the network contains at least two operable nodes, a response should be returned, in reply to the transmission of a token frame in the step S22, explained in (t-1) and (t-2). Upon reception of such response (step S23) the transfer of the communication right is completed, and the destination address is stored in the RAM 16 of the node which has transferred the communication right (step S24). The transfer of communication right thereafter is executed with the thus stored destination address (step S25), thereby dispensing with the steps (t-1) and (t-2) and improving the efficiency of communication.

(t-4) However, in consideration of the possibility that each node may become inoperable due, for example, to a failure in power supply during the operation of the network or that additional nodes may be rendered operable and enter communication, the steps S18–S23 in the above-explained procedures (t-1) and (t-2) are executed without the stored destination address, after the transfer of communication right is repeated for a predetermined number of times (steps S16 and S17), and the stored address of the node to which the communication right is to be transferred is renewed (step S24).

(t-5) Also in case a token frame, transmitted with the destination address determined by the above-explained procedure (t-3) (steps S25 and S22), is not responded properly (step S23), there is identified a situation in which the node of the destination has become inoperable and the program returns to the procedures of (t-1) and (t-2) starting from the step S19 to identify a new node to which the communication right is to be transferred.

Now, reference is made to a flow chart shown in FIG. 5 for detecting overlapping node addresses in the present embodiment.

In the local area network shown in FIG. 2, it is assumed that the nodes 2 (a(5)), 4 (c(3)) and 6 (e(1)) are in operable condition while the nodes 3 (b(4)) and 5 (d(3)) are not yet powered and in inoperable state.

In this situation, the token circulates among the nodes in the order of (a(5)) - (c(3)) - (e(1)) - (a(5)). In the following, there will be explained a procedure in case the node 3 (b(4)) is powered under such situation, while making reference to the flow chart shown in FIG. 5.

After the start of power supply, the node 3 (b(4)) inspects, in a step S1, the data communication frames on the channel 1 by means of the token detection unit 19 for examining the FC field 41 therein and awaits the reception of a token frame transmitted by another node. Upon detection of a token code in the FC field 41 in the received communication data, a step S2 stores the content of the source address 43, as the first source address a, in the first source address area Aa in the RAM 16.

A succeeding step S3 awaits the detection, by the token detection unit 19, of another token frame from another node. Upon detection of a token frame again, the CPU 15 compares, in a step S4, the source address 43 of the received token frame with the address number set by the self node address setting unit 17.

This procedure allows discrimination as to whether the network contains another node having a same address number as that of this node. Since, in this case, the address number "4" of the node 3 (b(4)) is not held by other nodes, not coincidence in said comparison and the program proceeds to a step S5.

Then, the source address 43 of the token received in the step S3 is further compared with the first source address a stored in the step S2. If the two are different, the program returns to the step S3 to await the reception of a next token frame, and the steps S4 and S5 are repeated thereafter for each token frame received.

Coincidence, if found in the step S5, means that a second token is received from a same node and that the token has completed a circulation along the logic ring of the network. At this point the node 3 (b(4)) can recognize the absence, in the network, of an operlapping address number which is the same as that of said node, and moves to an ordinary reception procedure shown in FIG. 6. Thus, the node 3 (b(4)) can thereafter transmit data upon reception of a token addressed thereto.

Now there will be explained the procedure in case a node 5 (d(3)), having an overlapping address number, is powered, again making reference to the flow chart shown in FIG. 5.

Upon receiving power supply, the node 5 (d(3)) stores, in a step S1, the content of the source address 43 of a received token, as the first source address a, in the area Aa of the RAM 16. Thereafter steps S3, S4 and S5 are executed in the same manner as in the node 3 (b(4)).

In this case, however, due to the presence of the node 4 (c(3)), having a same address number "3" as that of node 5 (d(3)), in the network, the node 5 (d(3)) receives a token from the node 4 (c(3)) in the step S4, namely before the token makes a full circulation in the step S5. Thus, at this point the node 5 (d(3)) recognizes the presence of the same address number in the network, and moves to a procedure for detecting overlapping addresses. In the procedure, the transmission is prohibited for the nodes (d(3)) and (c(3)). Then, the display device 20 is turned on to indicate the presence of nodes having the same address in the network. Also, the message is transmitted to the business machine 13 to advise the operator of an error in the address setting in the address setting unit 17.

As explained in detail in the foregoing, it is rendered possible to improve the working efficiency of the network, since a node newly entering the network is capable of confirming the appropriateness of the address number before the start of ordinary communication procedure and is excluded from the network in case the address number is overlapping.

Also, this abnormality detection can be achieved inexpensively, since it does not require a particular hardware but is realized with a communication control software.

Though the present invention has been explained by a preferred embodiment thereof, it is by no means limited to such embodiment but is subject to various modifications and variations within the scope and spirit of the appended claims.

What I claim is:

1. A data transmission system provided with plural transmission units connected to a communication medium, in which a transmission unit to which a right of communication has been assigned by a token passing procedure is permitted to perform data transmission, wherein each said transmission unit comprises:
   setting means for setting an address unique to said transmission unit;
   a recognition means for recognizing address information in a token transmitted between other transmission units on said communication medium; and
   detection means for detecting the presence of another transmission unit having the same address as that set by said setting means, by means of comparing an address recognized by said recognition means and an address set by said setting means during a predetermined period of time after start-up of the transmission unit.

2. A data transmission system according to claim 1, wherein said detection means is adapted to perform a detecting operation while the token makes a full circulation around other transmission units constituting the data transmission system.

3. A data transmission system according to claim 1, wherein said detection means is adapted to perform the detecting operation according to whether said recognition means recognizes a transmitting source address coincident with that set by setting means.

4. A data transmission system according to claim 1, wherein said detection means comprises display means for displaying the result of detection.

5. A data transmission system according to claim 1, wherein said detection means is adapted to prohibit a data transmitting operation, upon detecting the presence of another transmission unit having the same address as that set by said setting means.

6. A data transmission system according to claim 1, wherein said detection means is adapted to permit a data transmitting operation, when it does not detect a presence of another transmission unit having the same address as that set by said setting means.

7. A data transmission system provided with plural transmission units connected to a communication medium in which a transmission unit to which a right of communication has been assigned by a token-passing procedure is permitted to perform data transmission, wherein each said transmission unit comprises:
   setting means for setting an address unique to said transmission unit;
   memory means for storing the transmitting source address in a token first transmitted between other transmission units on said communication medium after start-up of the transmission unit; and
   detection means for detecting the presence of another transmission unit having the same address as that set by said setting means, by means of discriminating whether the transmitting source address in the token transmitted on said communication medium coincides with the address set by said setting means, within a period before a token, having the same transmitting source address as that stored in said memory means is transmitted again on said communication medium.

8. A data transmission system according to claim 7, wherein said detection means is adapted to prohibit a data transmitting operation, upon detecting presence of another transmission unit having the same address as that set by said setting means.

9. A data transmission system according to claim 7, wherein said detection means comprises display means for displaying the result of detection.

10. A data transmission system according to claim 7, wherein said detection means is adapted to permit a data transmitting operation, when it does not detect a presence of another transmission unit having the same address as that set by said setting means.

11. An overlapping address detecting method in a data transmission system provided with plural transmission units connected to a communication medium in which a transmission unit to which a right of communication has been assigned by a token passing procedure is permitted to perform data transmission, comprising the steps of:

(A) storing a transmitting source address in a token first transmitted between other transmission units on said communication medium after start-up of the transmission unit;

(B) discriminating coincidence between the transmitting source address in the token transmitted on said communication medium after said token is stored in step (A) and an address of a self transmission unit;

(C) recognizing receipt of the token provided with the transmitting source address stored in step (A); and (D) detecting a presence of another transmission unit having a same address as that of a self transmission unit by means of discriminating by step (B) before recognition in step (C).

12. A method according to claim 11, further comprising the step of prohibiting a data transmitting operation if a presence of another transmission unit having the same address as that of a self transmission unit is not detected in step (D).

13. A method according to claim 11, further comprising a step of displaying a detection result obtained in step (D).

14. A method according to claim 11, further comprising a step of permitting a data transmitting operation when said coincidence was not discriminated in step (B) before recognition by step (C).

15. A method according to claim 11, wherein in step (A) the transmitting source address in a token first transmitted is provided when power is provided to the transmission unit.

* * * * *

UNITED STATES PATENT AND TRADEMARK OFFICE
CERTIFICATE OF CORRECTION

PATENT NO. : 4,825,204
DATED : April 25, 1989
INVENTOR(S) : YASUO NAKAMURA

It is certified that error appears in the above-identified patent and that said Letters Patent is hereby corrected as shown below:

COLUMN 2

Line 48, "node" should be deleted.
    Line 49, "the 12;" should read --the node 12;--.

COLUMN 3

Line 1, "Through" should read --Though--.

COLUMN 5

Line 19, "operlapping" should read --overlapping--.

COLUMN 6

Line 5, "a" should be deleted.

Signed and Sealed this

Sixth Day of March, 1990

*Attest:*

JEFFREY M. SAMUELS

*Attesting Officer*      *Acting Commissioner of Patents and Trademarks*